(12) United States Patent
Gurvich et al.

(10) Patent No.: US 12,180,837 B1
(45) Date of Patent: Dec. 31, 2024

(54) COMPOSITE ACTUATOR SYSTEMS AND METHODS OF MAKING THE SAME

(71) Applicant: Goodrich Corporation, Charlotte, NC (US)

(72) Inventors: Mark R. Gurvich, Middletown, CT (US); Leo J. Veilleux, Jr., Wethersfield, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 18/238,945

(22) Filed: Aug. 28, 2023

(51) Int. Cl.
| | | |
|---|---|---|
| *F01B 31/28* | (2006.01) | |
| *B29C 70/32* | (2006.01) | |
| *B29C 70/38* | (2006.01) | |
| *B29C 70/68* | (2006.01) | |
| *B29K 705/00* | (2006.01) | |

(52) U.S. Cl.
CPC .............. *F01B 31/28* (2013.01); *B29C 70/32* (2013.01); *B29C 70/382* (2013.01); *B29C 70/682* (2013.01); *B29K 2705/00* (2013.01)

(58) Field of Classification Search
CPC ... B29K 2705/00; F01B 31/28; B29C 70/682; B29C 70/382; B29C 70/32
See application file for complete search history.

(56) References Cited

U.S. PATENT DOCUMENTS

| | | | | |
|---|---|---|---|---|
| 3,843,302 | A * | 10/1974 | Petzetakis | F16L 47/08 |
| | | | | 425/388 |
| 9,638,323 | B2 * | 5/2017 | Braun | B29C 53/585 |
| 10,919,512 | B2 * | 2/2021 | Foitzik | B60T 17/18 |
| 11,085,465 | B2 | 8/2021 | Goldring et al. | |
| 11,493,063 | B1 * | 11/2022 | Kimball | B29C 63/04 |

\* cited by examiner

*Primary Examiner* — Abiy Teka
(74) *Attorney, Agent, or Firm* — Kinney & Lange, P.A.

(57) ABSTRACT

In accordance with at least one aspect of this disclosure, a system (e.g., for aircraft systems) includes an actuator cylinder. The actuator cylinder comprises, a composite cylinder body, the composite cylinder body being axi-symmetric across at least a longitudinal axis. In embodiments, the composite cylinder body can include, a first plurality of plies laid in a first direction relative to the longitudinal axis and second plurality of plies laid in a second direction relative to the longitudinal axis different from the first direction to form a hollow chamber. The actuator cylinder can include a first metallic reinforcing ring and a second metallic reinforcing ring disposed at respective axial ends of the cylinder body configured to anchor the first plurality of plies and provide an axial reaction under axial stress and configured to provide load transfer from the cylinder body to one or more adjacent actuator components.

20 Claims, 10 Drawing Sheets

COMPOSITE ACTUATOR SYSTEMS AND METHODS OF MAKING THE SAME

TECHNICAL FIELD

The present disclosure relates to actuators and more particularly to composite actuators, and methods of making the same.

BACKGROUND

Typical metal monolithic actuator cylinders such as aluminum, titanium, and steel are thick and heavy to be able to maintain the working fluid (e.g., liquid or gas) pressure. These components can be sized for stress and deflection which results in excess weight which can be a disadvantage for certain applications where weight is a critical consideration, e.g., for aircraft implementations. Manufacturing of conventional metallic actuators can require a casting, machining or forging process which in some cases can result in increased cost. These fabrication processes can also be labor consuming due to requirements of high quality and inspection.

The conventional techniques have been considered satisfactory for their intended purpose. However, there is an ever present need for improved designs and methods of making for such actuators. This disclosure provides a solution for this need.

SUMMARY

In accordance with at least one aspect of this disclosure, a system (e.g., for aircraft systems) includes an actuator cylinder. The actuator cylinder comprises, a composite cylinder body. In certain embodiments, the composite cylinder body can be axi-symmetric across a longitudinal axis. In embodiments, the composite cylinder body can include, a first plurality of plies laid in a first direction relative to the longitudinal axis and second plurality of plies laid in a second direction relative to the longitudinal axis different from the first direction to form a hollow chamber. In embodiments, the first and second pluralities of plies can be unidirectionally fiber reinforced plies of a fiber reinforced polymer matrix.

The actuator cylinder can include a first metallic reinforcing ring and a second metallic reinforcing ring disposed at respective axial ends of the cylinder body configured to anchor the first plurality of plies and configured to provide load transferring from the first plurality of the plies and the respective metallic reinforcing rings under axial load.

In embodiments, the first plurality of plies are laid radially outward of the first and second metallic reinforcing rings. In certain embodiments, the first direction can be an axial direction relative to the longitudinal axis and the second direction is a radial, hoop direction relative to the longitudinal axis. In certain embodiments, the first direction can be a radial, hoop direction relative to the longitudinal axis and the second direction can be an axial direction relative to the longitudinal axis. In certain embodiments, reinforcing fibers of the composite cylinder body are formed of any combination of carbon, glass or organic fibers, and wherein polymeric matrix of the composite cylinder body is formed by either thermoset polymer matrix or thermoplastic polymer matrix.

In certain embodiments, a radial thickness of the first plurality of plies relative to the second plurality of plies can be about 1:2, where the first plurality of plies are laid in an axial direction and the second plurality of plies are in a radial direction. In certain embodiments, a radial thickness of the axial plies can be within 25-45% of total thickness, and a radial thickness of the hoop plies can be within 55-75% of total thickness, where the total radial thickness of the composite body adds to 100%. In embodiments, a ratio of the first plurality of plies to the second plurality of plies can be chosen based on a desired amount of stress resistances based on a geometry of the actuator and a projected load of the actuator. In embodiments, the axial and hoop plies can be distributed in discrete layers atop one another, or the plies can be mixed within and interleaved with one another.

In certain embodiments, the composite cylinder body can also include a third plurality of plies laid in a third direction relative to the longitudinal axis, different from the first direction and different from the second direction. In certain embodiments, the third direction can be a direction between 0 degrees and 90 degrees relative to the longitudinal axis, for example a direction between about 30 degrees and about 60 degrees to provide additional for geometrical integrity.

In embodiments, the first and second metallic reinforcing rings can form a first and second respective radially outward undulating portion configured to provide anchoring load-transferring with the first plurality of plies (e.g., with the actuator cylinder under axial load through non-axial reactions). In certain embodiments, an outer dimeter of the composite cylinder body can remain constant along the longitudinal axis, such that there are no undulating portions seen in the outer diameter of the composite cylinder body. In certain embodiments, the outer diameter of the cylinder body can be undulating at portions where the metallic reinforcing rings are included.

In embodiments, the composite cylinder body can include a respective three-layer portion at each axial end and a two-layer portion between the three-layer portions. The three-layer portion can include, from radially inboard to radially outboard, the metallic reinforcing ring, the first plurality of plies, and the second plurality of plies. The two-layer portion can include, from radially inboard to radially outboard, the first plurality of plies and the second plurality of plies.

In certain embodiments, the composite cylinder body can further include a coating or a liner disposed on an interior surface of the composite cylinder body, e.g., radially inboard of the first plurality of plies. In certain embodiments, the coating or liner can be a metallic coating or liner extending along the interior surface of the composite cylinder body between the three-layer portions, extending onto the inner diameter of the metallic rings. In such embodiments, the coating or liner can be configured to move axially with the composite cylinder body and the metallic reinforcing rings under axial load.

In certain embodiments, the coating or liner can be a metallic coating or liner extending along the interior surface of the composite cylinder body along the two-layer portion and not extending onto the three-layer portions. In certain such embodiments, the coating or liner may not move axially with the with the composite body or the metallic reinforcing rings under axial load.

In certain embodiments, the composite cylinder body can include a fire-resistant coating on an exterior surface of the composite cylinder body and/or on the interior surface of the composite cylinder body (e.g., in addition to or instead of the aforementioned coating/liner.

In embodiments, the chamber can be defined within the cylinder body configured to house at least a portion of an actuator piston therein for translation of the actuator piston along the longitudinal axis to drive an actuator output along the longitudinal axis. The actuator cylinder can further include a first actuator support ring and a second actuator support ring disposed at the first and second axial end of the cylinder body, respectively. to enclose the chamber (e.g., seal the chamber relative to ambient). Each of the actuator support rings can include a pressure channel defined therethrough configured to allow ingress and egress of fluid (liquid or gas) into and out of the chamber during actuation of the actuator piston. In certain embodiments, the pressure channel can be defined axially through the actuator support ring, or in certain embodiments, the pressure channels can be defined radially through the axial support ring, however in such embodiments, the pressure channel does not extend through the composite cylinder body.

In embodiments, the actuator piston can include an annular portion and an axial portion extending from the annular portion. The annular portion can be configured to be housed within the chamber to create a first chamber portion and a second chamber portion, such that a higher pressure in the first chamber portion than in the second chamber portion forces the actuator piston to a first position, and such that a higher pressure in the second chamber portion than in the first chamber portion forces the actuator piston to a second position to drive the actuator output between a first and second actuation position.

In embodiments, the annular portion of the actuator piston includes a sealing component configured to seal the first chamber portion from the second chamber portion. An actuator body can be disposed in the chamber and axially retained in the second actuator support ring. The actuator piston can be slidably mounted onto the actuator body to translate between the first position and the second position along the actuator body within the chamber.

In certain embodiments, the first actuator support ring and the second actuator support ring can be attached to the cylinder body by being threaded into the chamber and sealed to the chamber with a sealing member. In certain embodiments, the actuator support rings can be mounted to the cylinder body with a fastener. In certain such embodiments, the actuator support rings can be in direct contact with the metallic reinforcing ring. In certain embodiments, a reinforcing plate can be included radially between the actuator support ring and the metallic reinforcing ring. Here, no side cover may be included.

In certain embodiments, the actuator cylinder can include, a first side cover and a second side cover disposed axially outward of the first actuator support ring and the second actuator support ring, respectively. In certain embodiments, the side covers can be connected to the actuator support rings via a fastener and a c-ring can be included radially between the actuator support and the metallic reinforcing ring to further retain the actuator support ring within the cylinder.

In accordance with at least one aspect of this disclosure, a method of making an actuator cylinder (e.g., the actuator cylinder described above), can include installing the first metallic reinforcing ring at a first end of a mandrel and installing the second metallic reinforcing ring at a second end of the mandrel. The method can further include placing the first plurality of plies of a composite material on the mandrel in first direction and over top of the first and second metallic reinforcing rings and placing the second plurality of plies of the composite material in a second direction, opposite from the first direction. The second plurality of plies can be placed in two groups, a first group axially inboard of the first and second metallic reinforcing rings, and second group axially outboard of the metallic reinforcing rings. In certain embodiments, the second plurality of plies may not be placed over top of the first and second metallic reinforcing rings. Placing the first and second plurality of plies can be done using an automated fiber placement method of manufacture.

In certain embodiments, the method can include installing a liner on the mandrel before installing the first and second metallic reinforcing rings. In certain such embodiment, the method can include removing the mandrel from the liner and removing the mandrel from the liner after placing the second set plurality of plies. In certain embodiments, the mandrel can be the liner, or in other words, the liner can serve as the mandrel. In embodiments, the method can further include, solidifying (e.g., if the composite material is a thermoplastic) or curing (e.g., if the composite material is a thermoset) the first and second plurality of plies on the mandrel.

In embodiments, the method can further include applying a fire-resistant coating to an inner surface of the actuator cylinder or, in embodiments, the liner can be fire resistant. In certain embodiments, the method can include applying a fire-resistant coating to an exterior surface of the actuator cylinder.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
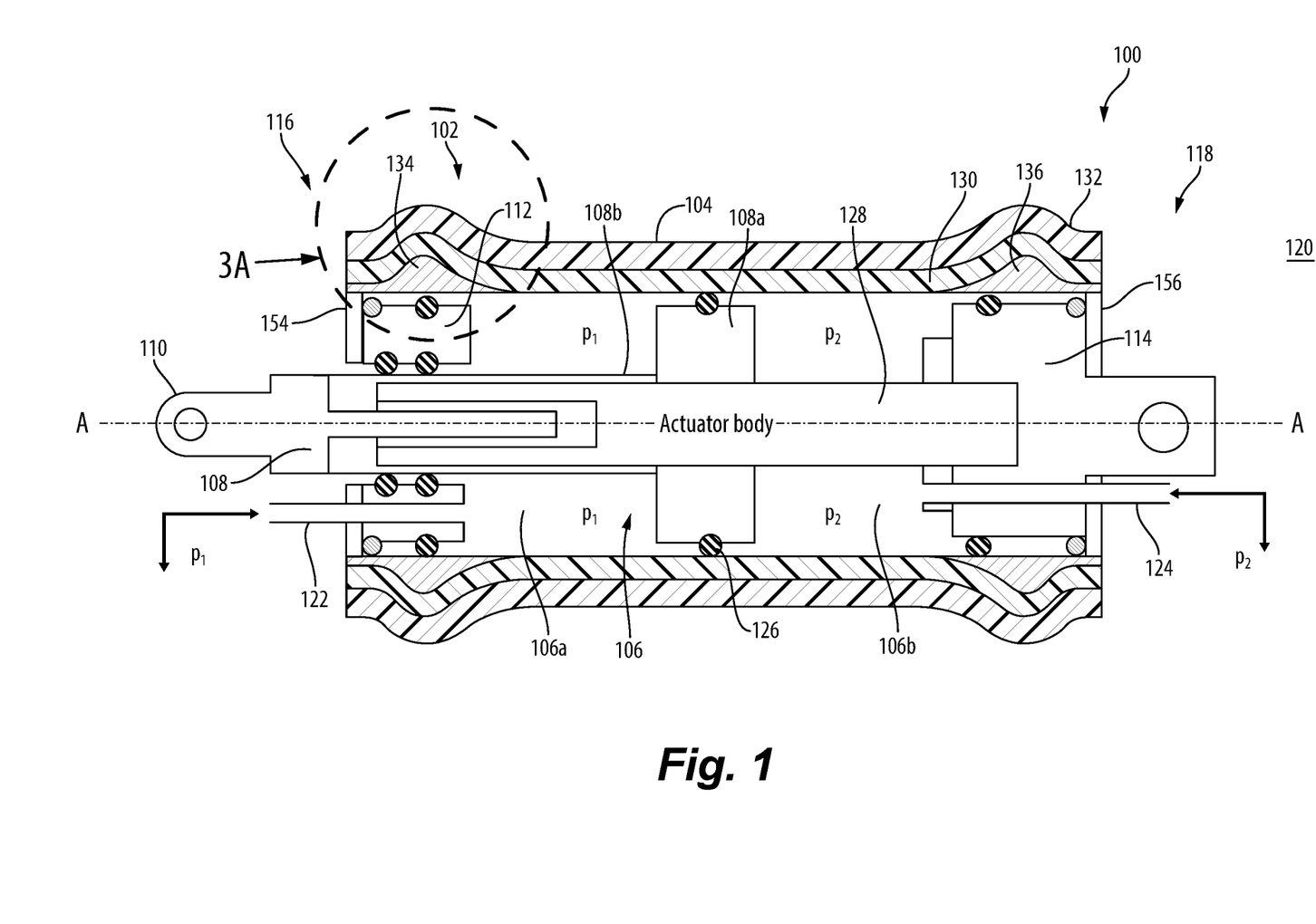
FIG. 1 is a schematic axial cross-sectional view of an actuator system in accordance with this disclosure, showing an actuator cylinder, having a composite cylinder body.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-11. Certain embodiments described herein can be used to replace a traditional metallic actuator cylinder with lightweight, non-metallic composite actuator cylinders.

Referring now to FIG. 1, in accordance with at least one aspect of this disclosure, a system 100 (e.g., for aircraft systems) includes an actuator cylinder 102. The actuator cylinder 102 comprises, a composite cylinder body 104, the composite cylinder body 104 being axi-symmetric across at least a longitudinal axis A. A chamber 106 can be defined within the cylinder body 104 configured to house at least a portion of an actuator piston 108 therein for translation of the actuator piston 108 along the longitudinal axis A to drive an actuator output 110 along the longitudinal axis A. The actuator cylinder 102 can further include a first actuator support ring 112 and a second actuator support ring 114 disposed at each axial end 116, 118 of the cylinder body 104 to enclose the chamber 106 (e.g., seal the chamber 106 relative to ambient 120).

Each of the actuator support rings 112, 114 can include a pressure channel 122, 124 defined therethrough configured to allow ingress and egress of actuator fluid (e.g., gas or liquid) into and out of the chamber 106 during actuation of the actuator piston 108. In certain embodiments, the pressure channels 12, 124 can be defined axially through the actuator support rings 112, 114 (e.g., as shown), or in certain embodiments, the pressure channels 122, 124 can be defined radially through the axial support rings 122, 124, or a combination thereof. In the embodiments described herein, the pressure channels 122, 124 do not extend through the composite cylinder body 104 to avoid through-thickness drilling of the composite body 104.

In embodiments, the actuator piston 108 can include an annular portion 108a and an axial portion 108b extending from the annular portion 108a. The annular portion 108a can be housed within the chamber 106 to create a first chamber portion 106a and a second chamber portion 106b, such that a higher pressure in the first chamber portion 106a than the second chamber portion 106b forces the actuator piston 108 to a first position (e.g., a retracted position shown in FIG. 1). When there is higher pressure the second chamber portion 106b than the first chamber portion 106a, the actuator piston is forced to a second position (e.g., an extended position, not shown). The movement of the actuator piston 108 between the first and second positions drives the actuator output 110 between a first and second actuation position.

In embodiments, the annular portion 108a of the actuator piston 108 can include a sealing component 126 configured to seal the first chamber portion 106a from the second chamber portion 106b. An actuator body 128 can be disposed in the chamber 106 and axially retained in the second actuator support ring 114. The actuator piston 108 can be slidably mounted onto the actuator body 128 to translate between the first position and the second position along the actuator body 128 within the chamber 106.

With reference now to FIGS. 1-4A, in embodiments, the composite cylinder body 104 can include, a first plurality of plies 130 laid in a first direction relative to the longitudinal axis A and second plurality of plies 132 laid in a second direction relative to the longitudinal axis A different from the first direction to form the hollow chamber 106. This is shown most clearly in FIG. 2. In certain embodiments, the plies 130, 132 of the composite cylinder body can be of any combination of carbon, glass or organic (e.g., Kevlar) fibers, and/or a polymer matrix as either thermoset or thermoplastic.

Figure 2:
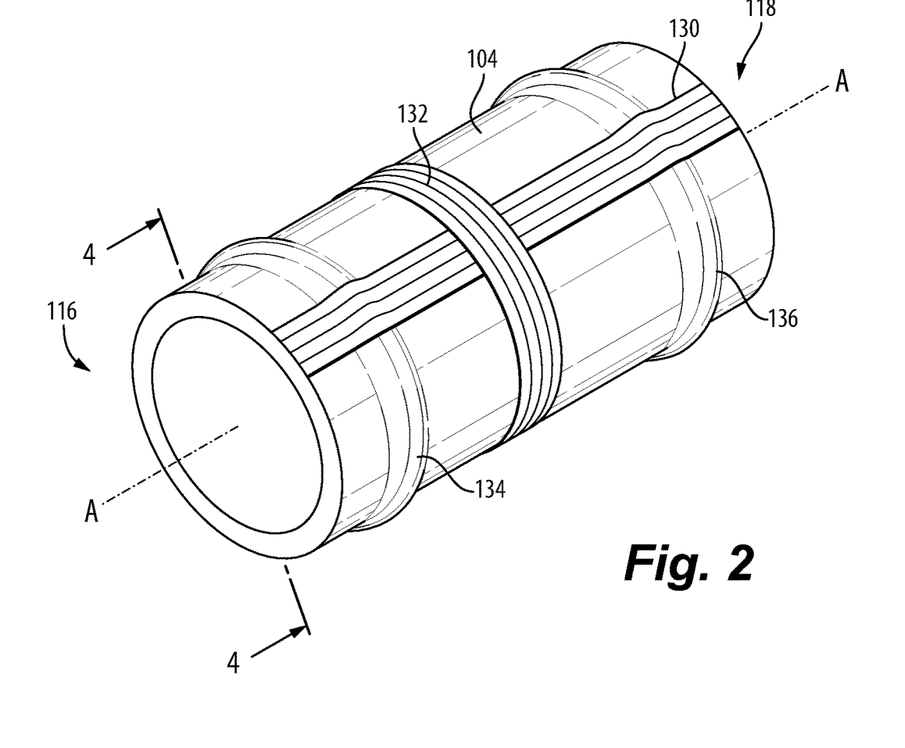
FIG. 2 is a schematic perspective view of the composite cylinder body of FIG. 1, showing an embodiment of orientations of composite fiber placement on the composite cylinder body.
Figure 2A:
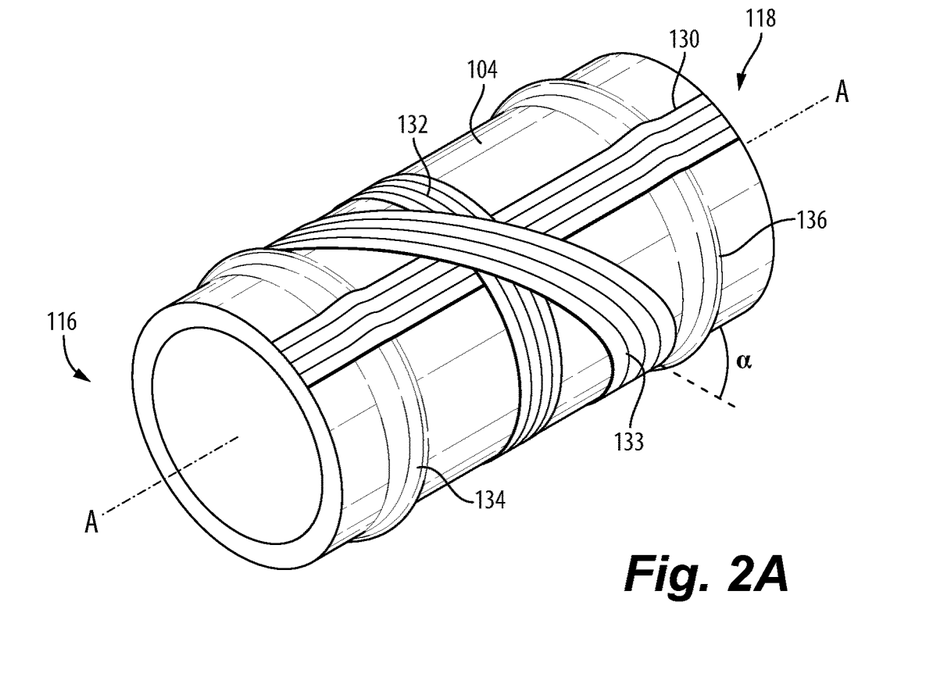
FIG. 2A is a schematic perspective view of the composite cylinder body of FIG. 1, showing another embodiment of orientations of composite fiber placement on the composite cylinder body.

In certain embodiments, as shown in FIG. 2, the first direction can be an axial direction [0°] relative to the longitudinal axis A and the second direction is a radial, hoop direction [90°] relative to the longitudinal axis A. In certain embodiments, the first plurality of plies in the axial direction can have small variations producing, for example, layup $[+\alpha/-\alpha]$ wherein the angle $\alpha$ is less than 15 deg. Similarly, in certain embodiments, the second plurality of plies in the axial direction can have small variations producing, for example, layup $[+\beta/-\beta]$ wherein the angle $\beta$ is more than 80 deg but less than 90 deg. In certain embodiments, e.g., as shown in FIG. 2A, a third plurality of plies 133 can be included and oriented at an angle between 0° and 90°.

A first metallic reinforcing ring 134 is included at the first end 116 of the cylinder body 104 and a second metallic reinforcing ring 136 is included at the second end 118 of the cylinder body 104 configured to anchor the first plurality of plies 130 and provide a non-normal reaction under axial stress and configured to provide load transfer from the cylinder body to one or more adjacent actuator components. A schematic of the forces applied to the composite body 104 and the associated reactions is illustrated in FIGS. 3A-3C.

Figure 3A:
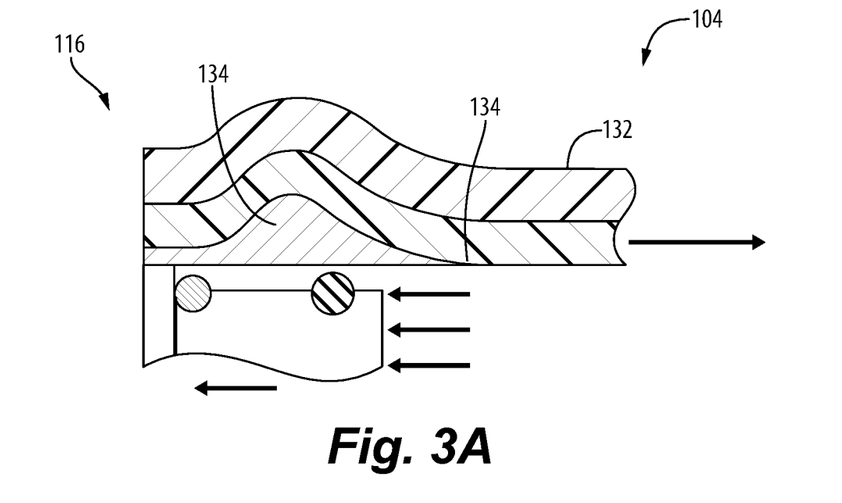
FIG. 3A is a schematic axial cross-sectional view of a portion of the cylinder of FIG. 1 showing axial forces and axial reactions acting on this portion.
Figure 3B:
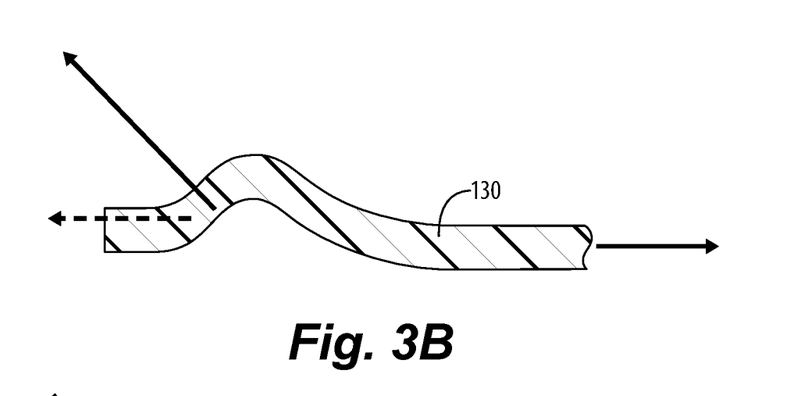
FIG. 3B is a schematic axial cross-sectional view of a plurality of plies of the composite body shown in isolation and showing reaction (and its axial projection) from an undulation of a metallic reinforcing ring in response to the axial load shown in FIG. 3A.
Figure 3C:
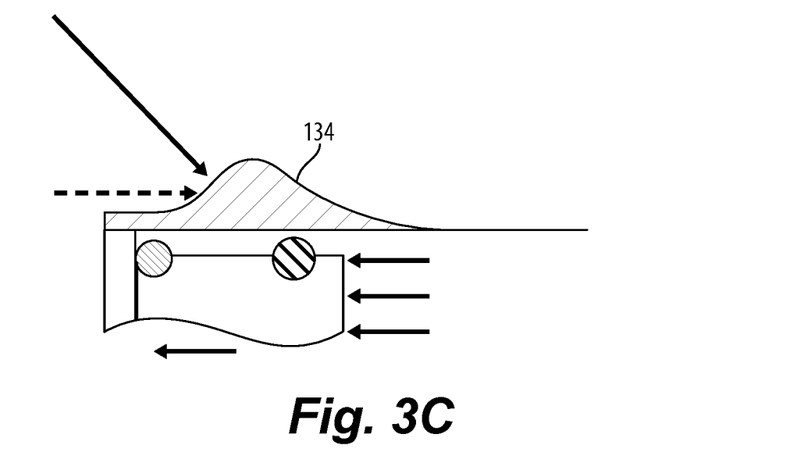
FIG. 3C is a schematic axial cross-sectional view of a metallic reinforcing ring shown in isolation and showing reaction (and its axial projection) in response to the axial load shown in FIG. 3A.

For example, in FIG. 3A, an equilibrium is shown in the axial direction for the first end of the composite body 104. In FIG. 3B, only the first plurality of plies 130 are shown in isolation. Here, there is an equilibrium in the axial direction for axial for the first plurality of plies 130, shown as a worst-case scenario, i.e., without adhesion, friction, etc. Dashed arrows at FIGS. 3B and 3C show axial projections of the reaction forces to illustrate the equilibrium state in the axial direction. FIG. 3C shows a corresponding equilibrium in the metallic ring 134, where no plies 130 are shown. In both FIGS. 3B and 3C, a non-axial reaction due to radially outward shape of the metallic ring 134 is shown in response to the axial forces applied, which would normally be felt by the composite body 104 during operation of the actuator. Accordingly, FIGS. 3A-3C show the load transfer under axial tension from the first plurality of plies 130 to the metallic reinforcing ring 134. While FIGS. 3A-3C show only the first end 116, it should be appreciated that a similar scheme would be true for the second axial end 118 of the composite body 104.

Figure 4:
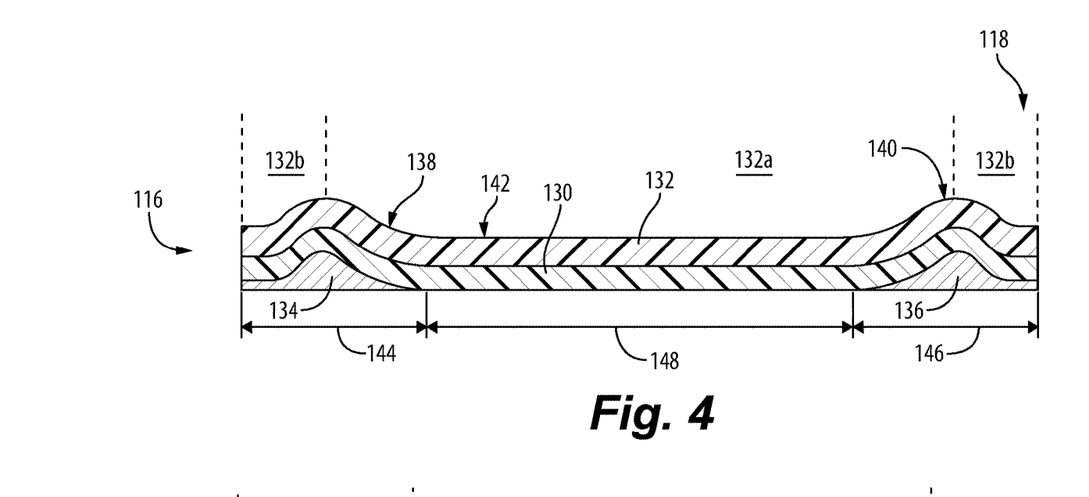
FIG. 4 is a schematic axial cross-sectional view of a portion of the composite body shown in FIG. 2 (i.e., without the internal actuator components)
Figure 4A:
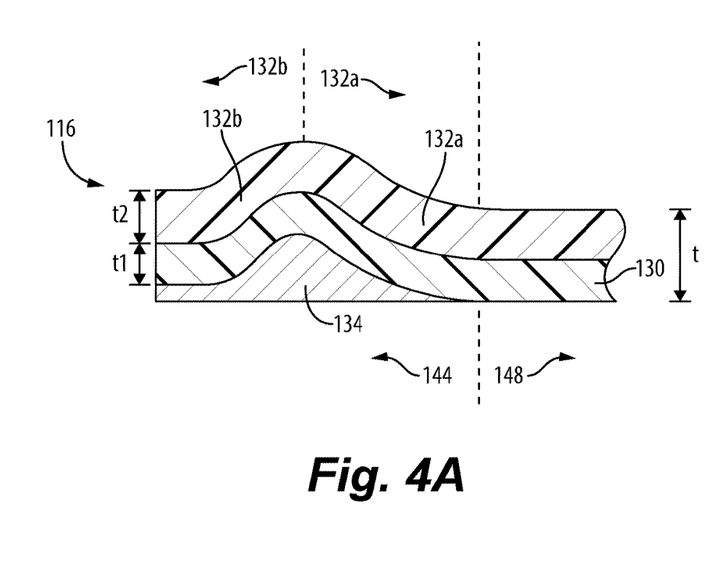
FIG. 4A is an enlarged partial schematic axial cross-sectional view of an end of the composite body of FIG. 2.
Figure 4B:
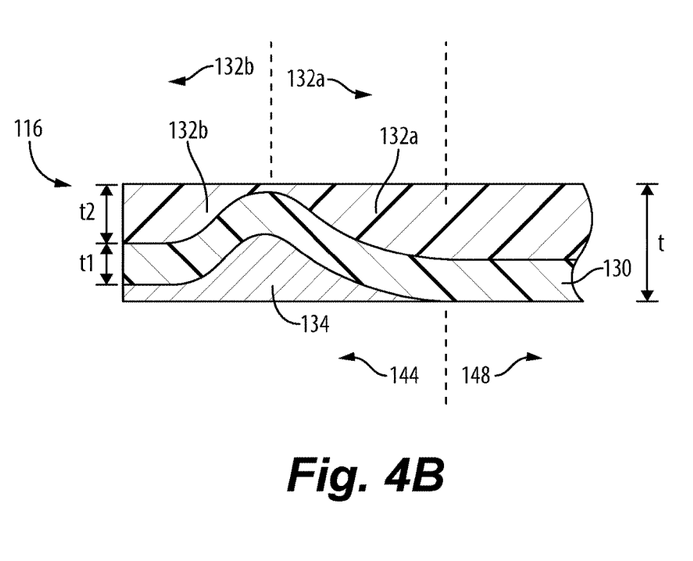
FIG. 4B is an enlarged partial schematic axial cross-sectional view of an end of an embodiment of the composite body.

Referring now to FIGS. 4, 4A, and 4B, in embodiments, the first plurality of plies 130 are laid over the first and second metallic reinforcing rings 134, 136, and the second plurality of plies 132 are laid over the first plurality of plies 130. In certain embodiments, the second plurality of plies can be laid over the metallic reinforcing rings 134, 136. However, in certain embodiments the second plurality of plies can be avoided over the metallic reinforcing rings 134, 136. The second plurality of plies 132 can be laid in two groups, a first group 132a between the metallic rings 134, 136, and a second group 132b outside of the metallic rings 134, 136 so that the first group 132a and the second group 132b of the second plurality of plies 132 bound the metallic rings 134, 136 on both sides. The first group 132a of plies 132 are configured to hold the first plurality of plies 130 in place on the outboard ends of the composite body 104. The second group 132b of plies 132 can be configured to provide structure to the composite body 104 to withstand the radial pressures within the chamber 106. In certain embodiments, the second plurality of plies 132 can be laid as a single plurality of plies, rather than two separate groups as shown.

In certain embodiments (FIG. 4A), a radial thickness t1 of the first plurality of plies 130 relative to the second plurality of plies 132 can be about 1:2, where the first plurality of plies 130 are laid in the axial direction and the second plurality of plies 132 are in the radial direction. In certain embodiments, a radial thickness t1 of the axial plies 130 can be within about 25-45% of total thickness t, and a radial thickness t2 of the radial, hoop plies 132 can be within about 55-75% of total thickness t, where the total radial thickness t of the composite body adds to 100%. In embodiments, the ratio of the first plurality of plies 130 to the second plurality of plies 132 can be chosen based on a desired amount of stress resistances and/or based on a geometry of the actuator and a projected load of the actuator. In embodiments, the axial 130 and radial plies 132 can be distributed in discrete layers atop one another, e.g., as shown, or the plies 130, 132 can be mixed within and interleaved with one another.

Still with reference to FIGS. 4-4B, in embodiments, the first and second metallic reinforcing rings 134, 136 can form a first 138 and second 140 respective undulating portion in a radial direction. These undulating portions 138 and 140 can be distributed axi-symmetrically in the hoop direction (for example, aligned with reinforcing rings 134, 136 as shown in FIG. 2). In certain embodiments, the outer diameter 142 can be undulating with the reinforcing rings, e.g., as shown in FIGS. 4 and 4A. In certain embodiments, as shown in FIG. 4B, an outer dimeter 142 of the composite cylinder body 104 can remain constant along the longitudinal axis A, where there are no undulating portions seen in the outer diameter 142 of the composite cylinder body 104.

In embodiments, the composite cylinder body 104 can include a respective three-layer portion 144, 146 at each axial end 116, 118 and a two-layer portion 148 between the three-layer portions 144, 146. The three-layer portions 144, 146 can include, from radially inboard to radially outboard, the metallic reinforcing ring 134, 136, the first plurality of plies 130, and the second plurality of plies 132. The two-layer portion 148 can include, from radially inboard to radially outboard, the first plurality of plies 130 and the second plurality of plies 132. Though two rings 134, 136 are shown, any suitable number of rings can be included and one having ordinary skill in the art having the benefit of this disclosure would understand how to vary the layers of plies to accommodate additional metallic reinforcing rings in view of that described herein.

Figure 5A:
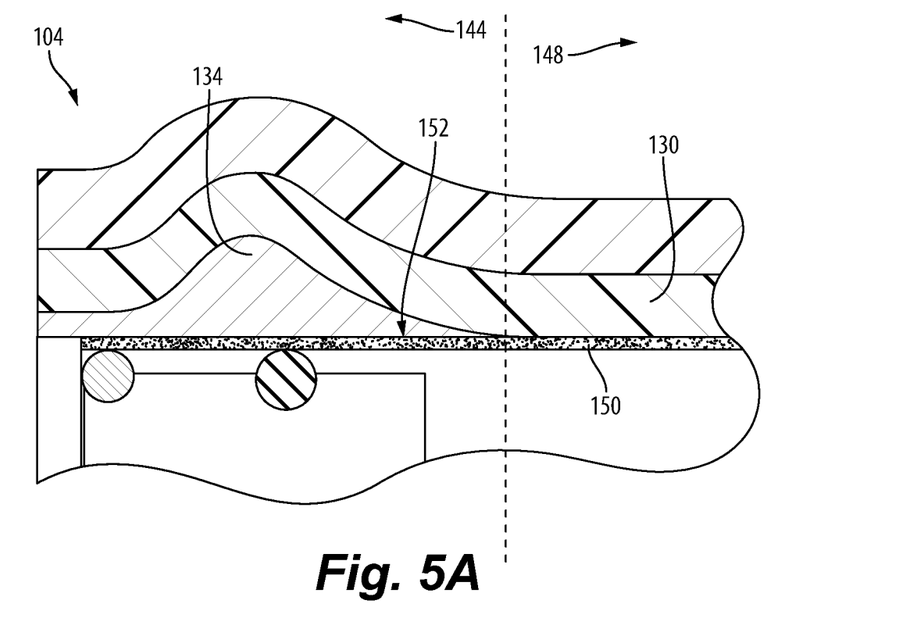
FIG. 5A is schematic axial cross-sectional view of a portion of an actuator cylinder, showing an embodiment of a coating on the composite body.

Referring now to FIGS. 5A-5D, in certain embodiments, the composite cylinder body 104, 204, 304 can further include a coating or a liner 150, 250, 350 disposed on an interior surface of the composite body 104, 204, 304, e.g., radially inboard of the first plurality of plies 130. In certain embodiments, as shown in FIG. 5A, the coating or liner 150 can be a coating extending along the entirety of the interior surface 152 of the composite cylinder body 104 between the three-layer portions 144, 146, extending onto the interior surface 152 of the metallic rings 134, 136. In embodiments, the coating can be a surface coating designed for enhanced wear resistance.

Figure 5B:
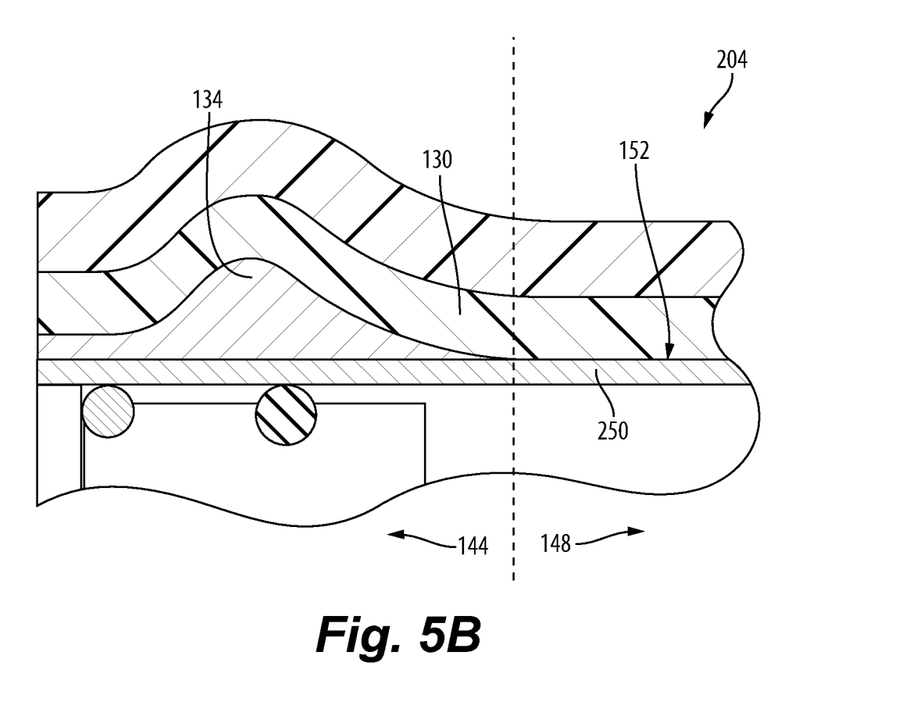
FIG. 5B is schematic cross-sectional view of a portion of an actuator cylinder, showing an embodiment of a liner on the composite body.

In certain embodiments, such as shown in FIG. 5B, the coating or liner 250 can be a metallic liner extending along the entirety of the interior surface 152 of the composite cylinder body 104 between the three-layer portions 144, 146, extending onto the interior surface 152 of the metallic rings 134, 136. This liner 250 can be an integrated liner and configured to move axially with the composite cylinder body 104 and the metallic reinforcing rings 134, 136 under axial load.

Figure 5C:
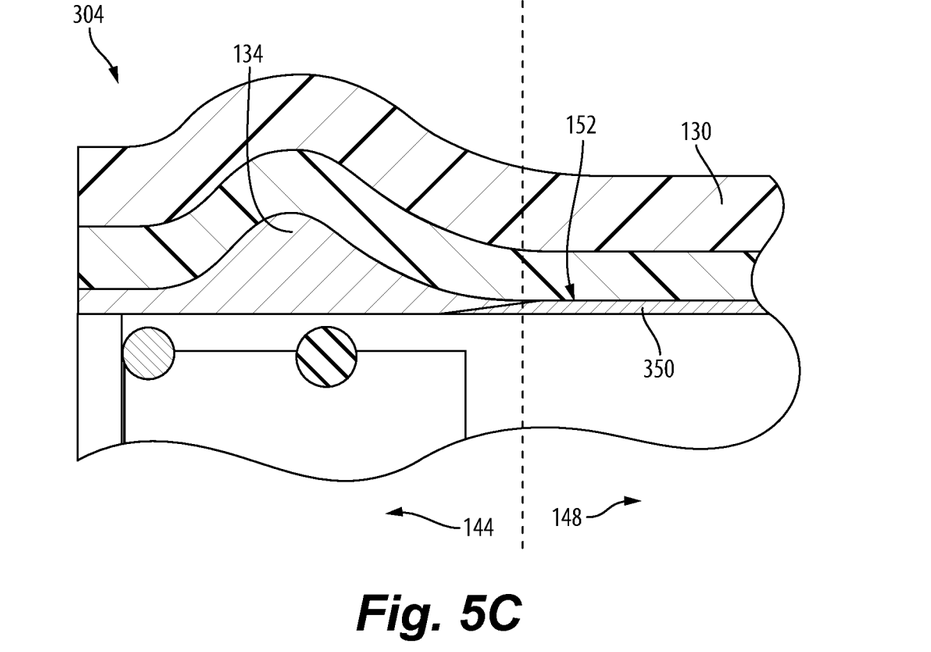
FIG. 5C is schematic axial cross-sectional view of a portion of an actuator cylinder, showing another embodiment of a liner on the composite body.

In certain embodiments, such as shown in FIG. 5C, the coating or liner 350 can be a metallic liner extending along the interior surface 152 of the composite cylinder body 104 only along the two-layer portion 148 and not extending onto the three-layer portions 144, 146. Here, the liner 350 may not move axially with the with the composite body 104 or the metallic reinforcing rings 134, 136 under axial load (no load transfer with the metallic rings). The liners 250 and 350 can additionally be coated with coating 150 in certain applications, in embodiments.

Figure 5D:
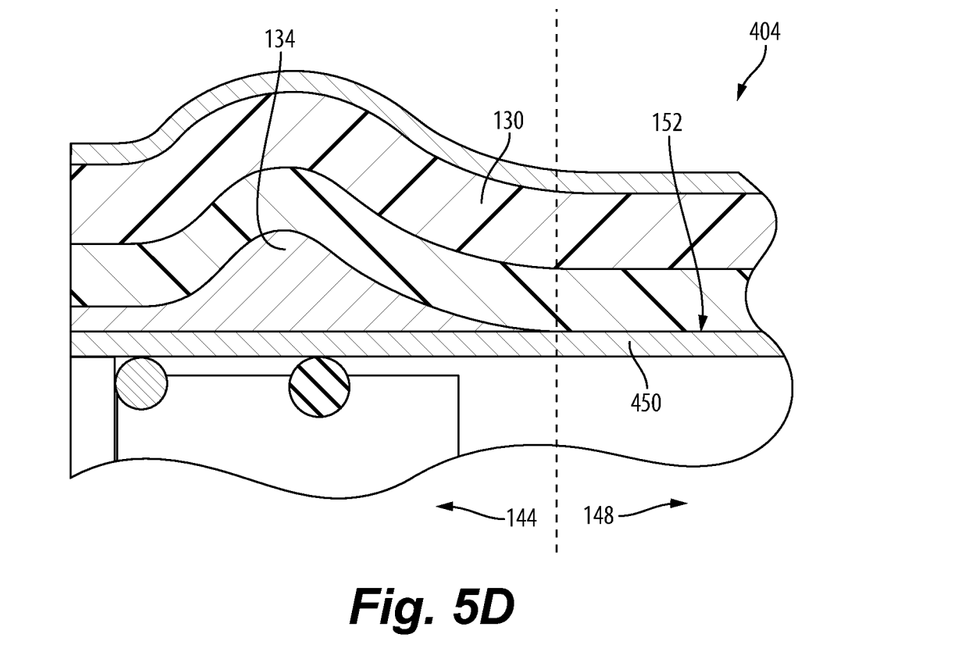
FIG. 5D is schematic axial cross-sectional view of a portion of an actuator cylinder, showing another embodiment of a coating on an interior and/or exterior surface of the composite body.

In certain embodiments, the interior surface 152 of the actuator cylinder can include a fire-resistant coating thereon. The fire-resistant coating can be in addition to the coating/liner 150, 250, 350, or in place of the coating/liner 150, 250, 350. In certain embodiments, the coating/liner 150, 250, 350, can itself be fire resistant or have fire resistant properties. In certain embodiments, as shown in FIG. 5D an outer surface of the actuator cylinder can have a fire-resistant coating 450. In embodiments, e.g., as shown, the fire-resistant coating can be in the interior surface and the exterior surface.

Figure 6:
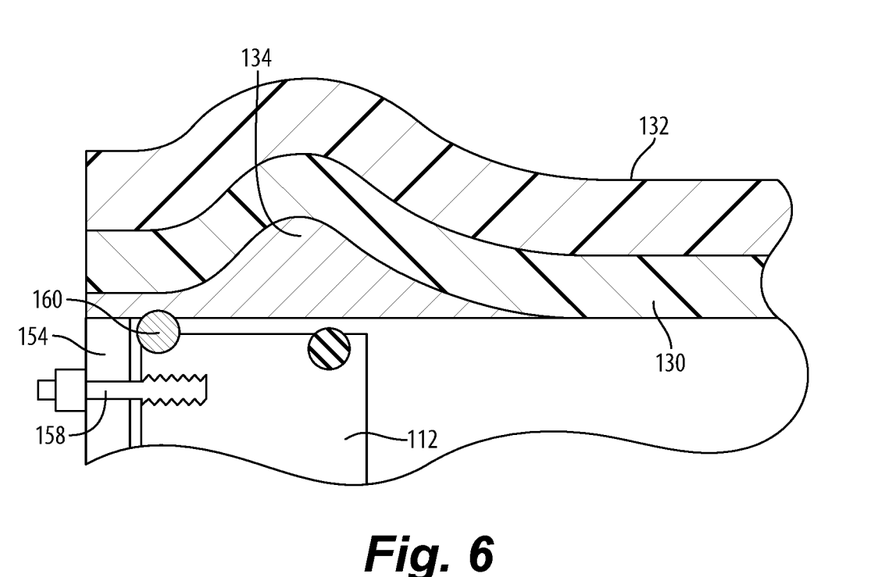
FIG. 6 is a schematic axial cross-sectional view of a portion of an actuator cylinder, showing an embodiment of retaining a side cover and an actuator support ring to the actuator cylinder.

Referring now to FIG. 6, in certain embodiments, the actuator cylinder 102 can include, a first side cover 154 and a second side cover 156 disposed axially outward of the first actuator support ring 112 and the second actuator support ring 114, respectively. In certain embodiments, the side covers 154, 156 can be connected to the actuator support rings 112, 114 via a fastener 158, and a c-ring 160 can be included radially between the actuator support ring 112 and the metallic reinforcing ring 134 to further retain the actuator support ring 112 within the cylinder body 104. In certain embodiments, the side covers 154, 156 can be welded to the metallic reinforcing rings 134, 136

Figure 7A:
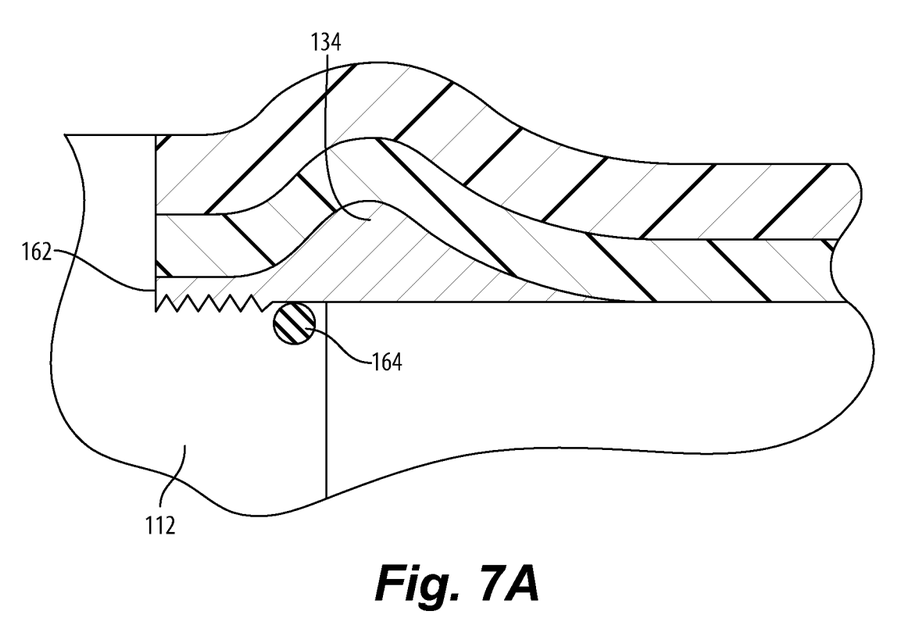
FIG. 7A is a schematic axial cross-sectional view of a portion of an actuator cylinder, showing an embodiment of retaining an actuator support ring to the actuator cylinder.
Figure 7B:
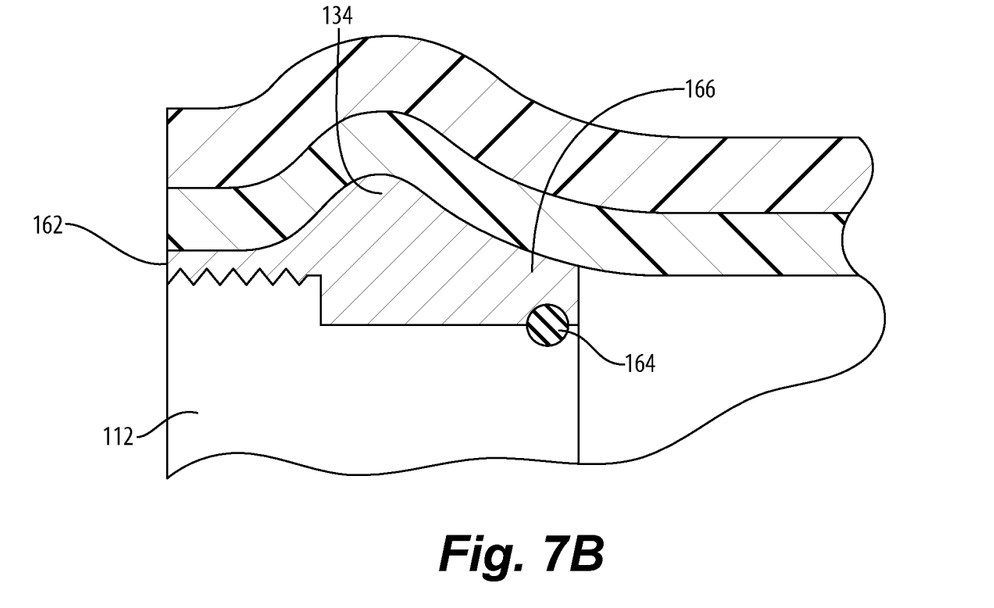
FIG. 7B is a schematic axial cross-sectional view of a portion of an actuator cylinder, showing another embodiment of retaining an actuator support ring to the actuator cylinder.
Figure 8:
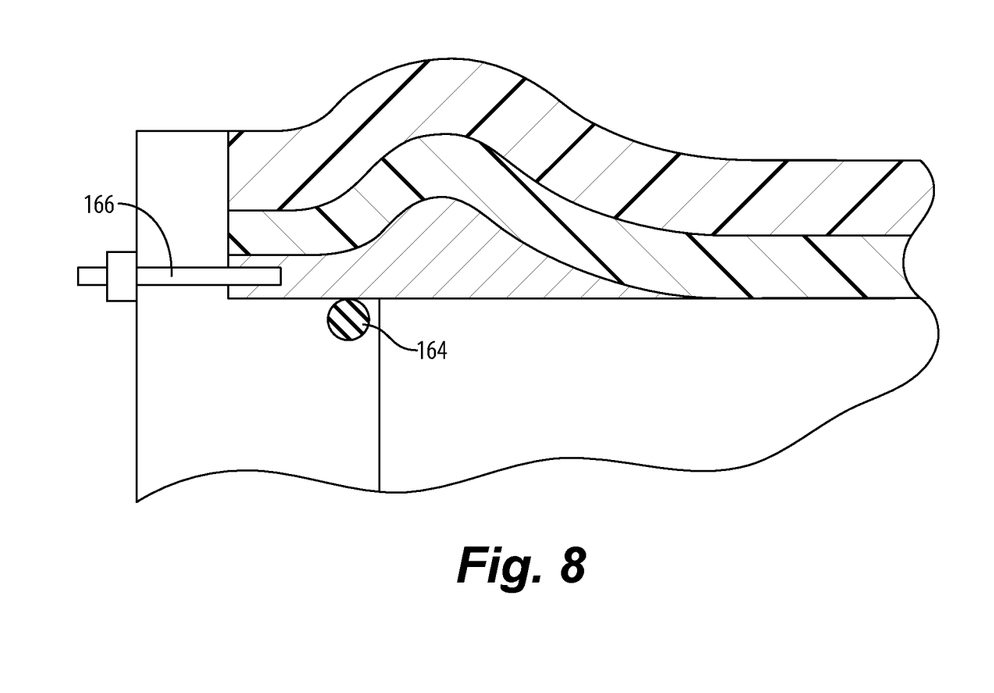
FIG. 8 is a schematic axial cross-sectional view of a portion of an actuator cylinder, showing another embodiment of retaining an actuator support ring to the actuator cylinder.

Referring now to FIGS. 7A, 7B and 8, in certain embodiments, no side cover 154, 156 may be included, and instead the first actuator support ring 112 and the second actuator support ring 114 can be attached directly to the cylinder body 104. As shown in FIGS. 7A and 7B, the support ring 112 can be threaded into the chamber 106 via threads 162 between the support ring 112 and the metallic reinforcing ring 134. The support ring 112 can be sealed to the chamber 106 with a sealing member 164. In certain embodiments, the actuator support rings 112, 114 can be in direct contact with at least a portion of the metallic reinforcing ring 134, 136. In certain embodiments, a reinforcing plate 166 can be included radially between the actuator support ring 112 and the metallic reinforcing ring 134, such as shown in FIG. 7B. In certain embodiments, such as shown in FIG. 8, the actuator support rings 112, 114 can be mounted to the cylinder body 104 with a fastener 166, where the fastener extends through the support ring 112 and into the metallic reinforcing ring 134. Here, there are no threads on either the support ring 112 or the metallic ring 134. While FIGS. 6-8 only show a truncated portion of the cylinder body 104, e.g., the first side 116, it should be understood that the second side 118 of cylinder body would be arranged in the same manner for each respective FIGS. 7A, 7B, and 8.

Figure 9:
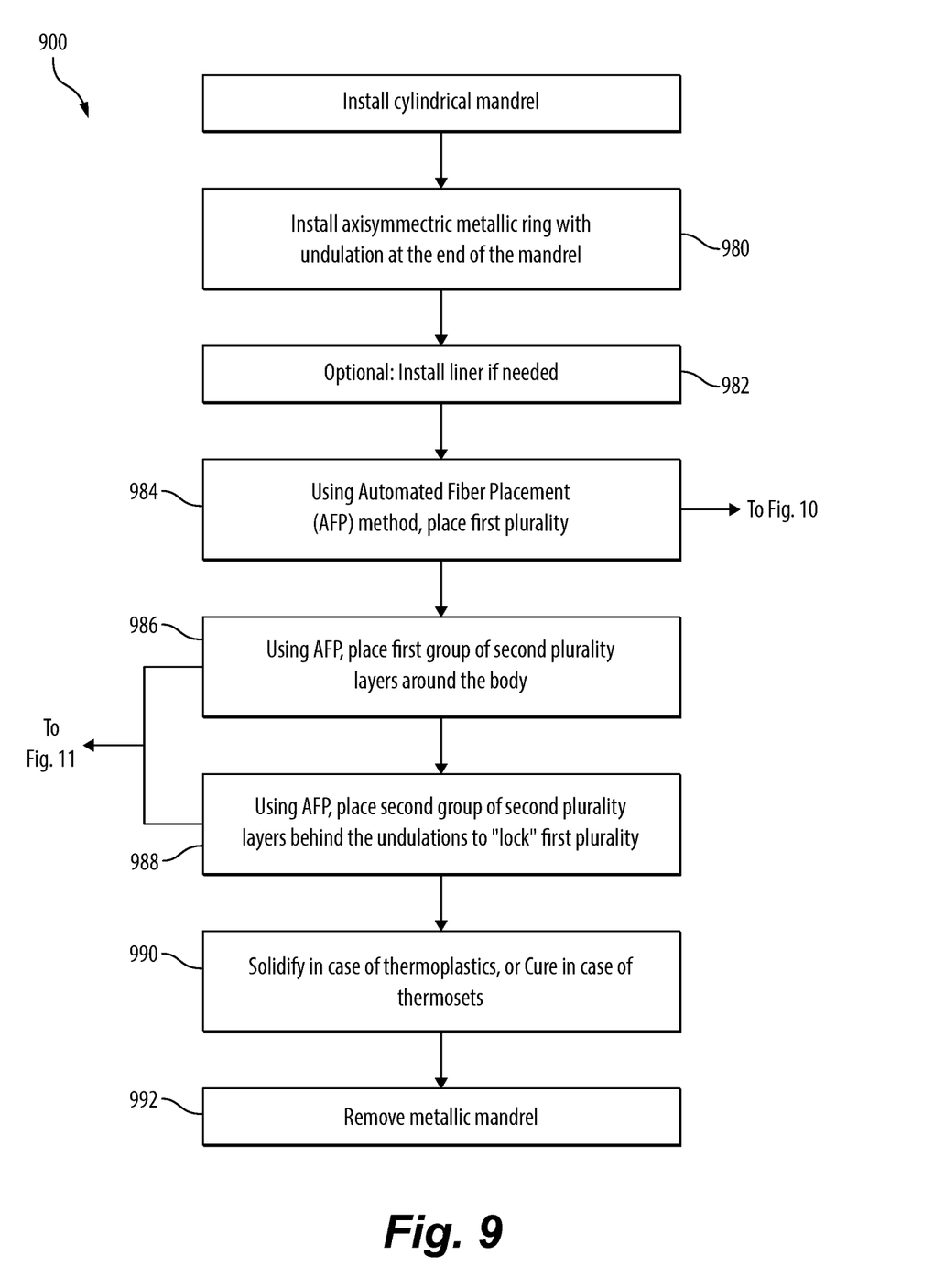
FIG. 9 is a box diagram of a method of forming the actuator cylinder composite body.
Figure 10:
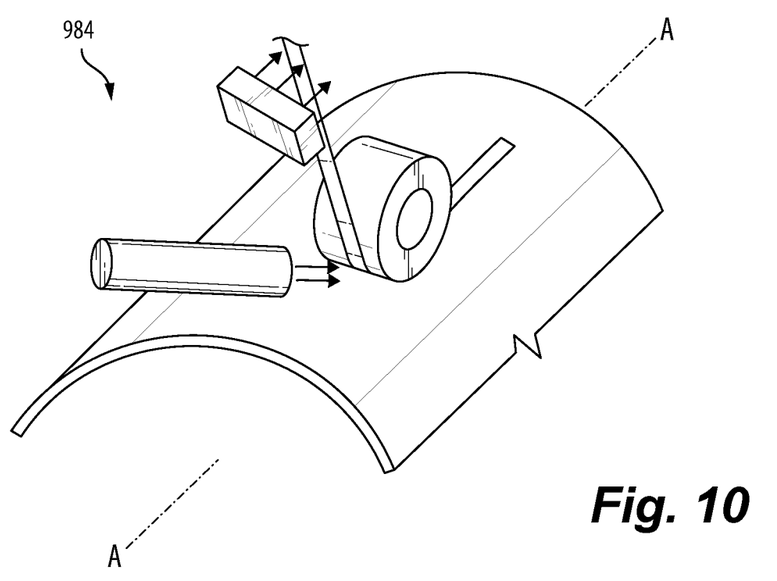
FIG. 10 is a perspective illustration of a portion of the method of FIG. 9 showing schematically placement of the first plurality of plies.
Figure 11:
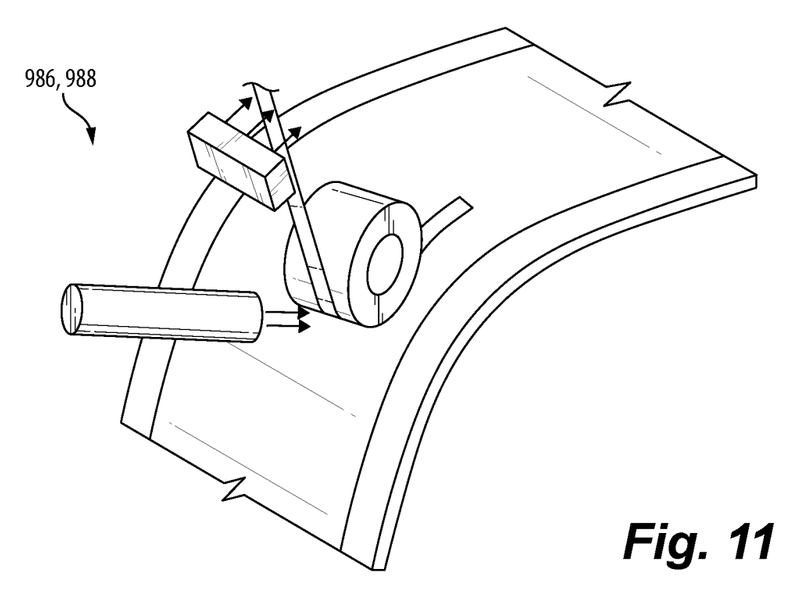
FIG. 11 is a perspective illustration of another portion of the method of FIG. 9 showing schematically placement of the second plurality of plies.

With reference now to FIGS. 9-11, in accordance with at least one aspect of this disclosure, a method 900 of making an actuator cylinder (e.g., the actuator cylinder 102 described above), can include installing 980 the first metallic reinforcing ring at a first end of a mandrel and installing 980 the second metallic reinforcing ring at a second end of the mandrel. In certain embodiments, the method can include installing 982 a liner on the mandrel before installing the first and second metallic reinforcing rings, if a liner is desired.

The method 900 can further include placing 984, via Automated Fiber Placement (AFP) manufacturing method, the first plurality of plies 130 of the composite material on the mandrel in first direction and over top of the first and second metallic reinforcing rings. In certain embodiments, AFP can be substituted by manual placement of composite plies or by other manufacturing techniques, such as, for example, braiding or filament-winding methods. This is shown more clearly in FIG. 10. The method 900 can include placing 986, via AFP, the second plurality of plies of the composite material in a second direction, opposite from the first direction. This is shown more clearly in FIG. 11. The second plurality of plies can be placed in two groups (e.g., steps 986, 988), a first group axially inboard of the first and second metallic reinforcing rings, and second group axially outboard of the metallic reinforcing rings. the second plurality of plies is not placed over top of the first and second metallic reinforcing rings.

In embodiments, the method 900 can further include, solidifying 990 (e.g., if the composite material is a thermoplastic) or curing 990 (e.g., if the composite material is a thermoset) the first and second plurality of plies on the mandrel. In certain embodiments, the method 900 can include removing 992 the mandrel from the liner or from the hollow cylinder if no liner is desired. In certain embodiments, the mandrel can be the liner, or in other words, the liner can serve as the mandrel, thus no mandrel may be removed. In certain embodiments, a fire-protection coating can be applied on the exterior surface of the actuator cylinder. In embodiments, the external coating can be, for example, a painted ablative coating or a plated coating such as chrome or nickel or other thin protective coatings.

Embodiments include an actuator system 100, shown in FIG. 1 as its axial cross-section. Using different combinations of pressures p1 and p2 in corresponding chambers, the actuator output can be forced to move axially. Due to internal pressure as a dominant load condition, the actuator cylinder is mainly under conditions of bi-axial tension, where a) tension in the hoop direction is driven by the radial expansion; and b) tension in the axial direction is driven by axial expansion at actuator supports (or side covers). Conditions of bi-axial tension make application of high strength fibers, e.g., the composite plies as discussed herein, very advantageous. Therefore, embodiments of this disclosure provide for a replacement of heavy and expensive monolithic, metallic actuation cylinders by forming the cylinder from efficient fiber-reinforced polymer-matrix composite implementations.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising,
    an actuator cylinder, comprising;
        a composite cylinder body, the composite cylinder body being axi-symmetric across a longitudinal axis, the composite cylinder body including,
            a first plurality of plies laid in a first direction relative to the longitudinal axis; and
            second plurality of plies laid in a second direction relative to the longitudinal axis different from the first direction to form together with the first plurality a hollow chamber;
        a first metallic reinforcing ring and a second metallic reinforcing ring disposed at respective axial ends of the cylinder body configured to anchor the first plurality of plies and configured to provide load transferring from the first plurality of the plies and the respective metallic reinforcing rings under axial load, wherein the first plurality of plies is laid radially outward of the first and second metallic reinforcing rings,
        wherein the chamber is defined within the cylinder body and is configured to house at least a portion of an actuator piston therein for translation of the actuator piston along the longitudinal axis to drive an actuator output along the longitudinal axis.

2. The system of claim 1, wherein the first direction is an axial direction relative to the longitudinal axis and the second direction is a radial, hoop direction relative to the longitudinal axis.

3. The system of claim 1, wherein the first direction is a radial, hoop direction relative to the longitudinal axis and the second direction is an axial direction relative to the longitudinal axis.

4. The system of claim 1, wherein the first and second metallic reinforcing rings form a first and second respective radially-outward undulating portions configured to provide anchoring load-transferring with the first plurality of plies with the cylinder under axial load.

5. The system of claim 1, wherein the composite cylinder body includes a three-layer portion at each axial end and a two-layer portion between the three-layer portions, wherein the three-layer portion includes, from radially inboard to radially outboard, the metallic reinforcing ring, the first plurality of plies, and the second plurality of plies, and wherein the two-layer portion includes, from radially inboard to radially outboard, the first plurality of plies and the second plurality of plies.

6. The system of claim 5, wherein the composite cylinder body further includes a coating or a liner disposed on an interior surface of the composite cylinder body.

7. The system of claim 6, wherein the coating or liner is a metallic coating or liner extending along the interior surface of the composite cylinder body between the three-layer portions.

8. The system of claim 6, wherein the coating or liner is a metallic coating or liner extending along the interior surface of the composite cylinder body along the two-layer portion and not extending onto the three-layer portions.

9. The system of claim 1, wherein the composite cylinder body includes a fire-resistant coating on an exterior surface of the composite cylinder body and/or on an interior surface of the composite cylinder body.

10. The system of claim 1, wherein the actuator cylinder further comprises, a first actuator support ring and a second actuator support ring disposed at the first and the second axial ends of the cylinder body, respectively, to enclose the chamber, wherein each of the actuator support rings includes a pressure channel defined therethrough configured to allow ingress and egress of liquid or gas into and out of the chamber during actuation of the actuator piston.

11. The system of claim 10, wherein the actuator piston includes an annular portion and an axial portion extending from the annular portion, wherein the annular portion is configured to be housed within the chamber to create a first chamber portion and a second chamber portion, such that a higher pressure in the first chamber portion than in the second chamber portion forces the actuator piston to a first position, and such that a higher pressure in the second chamber portion than in the first chamber portion forces the actuator piston to a second position to drive the actuator output between a first and second actuation position.

12. The system of claim 11, wherein the annular portion of the actuator piston includes a sealing component configured to seal the first chamber portion from the second chamber portion.

13. The system of claim 12, wherein the actuator cylinder further includes, a first side cover and a second side cover disposed axially outward of the first actuator support ring and the second actuator support ring, respectively.

14. The system of claim 1, wherein reinforcing fibers of the composite cylinder body are formed of any combination of carbon, glass or organic fibers, and wherein polymeric matrix of the composite cylinder body is formed by either thermoset polymer matrix or thermoplastic polymer matrix.

15. A method of making the actuator cylinder of claim 1, comprising:
    installing the first metallic reinforcing ring at a first end of a mandrel;
    installing the second metallic reinforcing ring at a second end of the mandrel;
    placing the first plurality of plies of a composite material on the mandrel in first direction and over top of the first and second metallic reinforcing rings;
    placing the second plurality of plies of the composite material in a second direction, opposite from the first direction, wherein the second plurality of plies are placed in two groups, a first group axially inboard of the first and second metallic reinforcing rings, and second group axially outboard of the metallic reinforcing rings.

16. The method of claim 15, further comprising:
    installing a liner on the mandrel before installing the first and second metallic reinforcing rings; and
    removing the mandrel from the liner after placing the second set plurality of plies.

17. The method of claim 16, further comprising applying a fire-resistant coating to an inner surface of the actuator cylinder or wherein the liner is fire-resistant.

18. The method of claim 15, further comprising applying a fire-resistant coating to an exterior surface of the actuator cylinder.

19. The method of claim 15, further comprising:
- solidifying or curing the first and second pluralities of plies on the mandrel; and
- removing the mandrel from the solidified or cured actuator cylinder.

20. The method of claim 15, wherein placing the first and the second pluralities of plies includes placing the first and second plurality of plies using automated fiber placement.

* * * * *